(12) United States Patent
Akita

(10) Patent No.: US 8,184,857 B2
(45) Date of Patent: May 22, 2012

(54) MOVING OBJECT RECOGNIZING APPARATUS

(75) Inventor: Tokihiko Akita, Nagoya (JP)

(73) Assignee: Aisin Seiki Kabushiki Kaisha, Aichi (JP)

( * ) Notice: Subject to any disclaimer, the term of this patent is extended or adjusted under 35 U.S.C. 154(b) by 495 days.

(21) Appl. No.: 12/525,018

(22) PCT Filed: Jan. 24, 2008

(86) PCT No.: PCT/JP2008/050951
§ 371 (c)(1),
(2), (4) Date: Jul. 29, 2009

(87) PCT Pub. No.: WO2008/093585
PCT Pub. Date: Aug. 7, 2008

(65) Prior Publication Data
US 2010/0027844 A1    Feb. 4, 2010

(30) Foreign Application Priority Data
Jan. 30, 2007    (JP) .................................. 2007-019319

(51) Int. Cl.
*G06K 9/00* (2006.01)
(52) U.S. Cl. ......... 382/103; 348/143; 348/148; 382/100
(58) Field of Classification Search .................. 382/100, 382/103; 348/143, 148
See application file for complete search history.

(56) References Cited

U.S. PATENT DOCUMENTS

| | | | |
|---|---|---|---|
| 5,036,474 A | 7/1991 | Bhanu et al. | |
| 5,265,172 A | 11/1993 | Markandey et al. | |
| 6,330,353 B1 | 12/2001 | Lai et al. | |
| 6,480,615 B1 | 11/2002 | Sun et al. | |
| 6,534,884 B2 | 3/2003 | Marcus et al. | |
| 7,190,282 B2 * | 3/2007 | Maemura et al. | 340/903 |
| 7,446,798 B2 * | 11/2008 | Comaniciu et al. | 348/148 |
| 2004/0062420 A1 | 4/2004 | Rohaly | |
| 2007/0299596 A1 * | 12/2007 | Moritz et al. | 701/117 |

FOREIGN PATENT DOCUMENTS

EP    0 390 050 A2    10/1990
(Continued)

OTHER PUBLICATIONS

Supplementary European Search Report issued in European Application No. 08 70 3779 dated Apr. 5, 2011 (4 pages).
Bruce D. Lucas, et al., "An Iterative Image Registration Technique with an Application to Stereo Vision," Proceedings DARPA Image Understanding Workshop, Apr. 1981, pp. 121-130.
(Continued)

*Primary Examiner* — Jingge Wu
*Assistant Examiner* — Shefali Goradia
(74) *Attorney, Agent, or Firm* — Sughrue Mion, PLLC

(57) ABSTRACT

The moving object recognizing apparatus includes a data acquisition unit for acquiring image data obtained in time series by an imaging device, a recognition unit for recognizing a moving object by executing a plurality of image processing operations on two of the image data obtained at different times, the plurality of image processing operations including an operation of calculating correlativity of a same recognition target pattern, and a reliability calculation unit for calculating recognition reliability indicative of reliability of recognition of the moving object, based upon at least one of the results of the respective image processing operations by the recognition unit.

20 Claims, 8 Drawing Sheets

FOREIGN PATENT DOCUMENTS

| | | |
|---|---|---|
| JP | 06-130076 A | 5/1994 |
| JP | 06-282655 A | 10/1994 |
| JP | 07-037063 A | 2/1995 |
| JP | 08-083345 A | 3/1996 |
| JP | 09-086314 A | 3/1997 |
| JP | 09-293185 A | 11/1997 |
| JP | 2005-309746 A | 11/2005 |
| JP | 2006-318345 A | 11/2006 |
| WO | 2005/081178 A1 | 9/2005 |
| WO | 2008/044592 A1 | 4/2008 |

OTHER PUBLICATIONS

Carlo Tomasi, et al., "Detection and Tracking of Point Features," Shape and Motion from Image Streams: a Factorization Method—Part 3, Technical Report CMU-CS-91-132, Apr. 1991, pp. 1-20.

International Preliminary Report on Patentabiliety for PCT/JP2008/050951 including the Written Opinion of the ISA dated Aug. 4, 2009 (7 pages).

* cited by examiner number of optical flows size of target object dispersion value of optical flow velocity deviation amount

MOVING OBJECT RECOGNIZING APPARATUS

TECHNICAL FIELD

The present invention relates to a moving object recognizing apparatus for recognizing a moving object from image data.

BACKGROUND ART

In recent years, a variety of techniques have been proposed for improving safety in vehicle driving. As one such method, there has been proposed a moving object recognizing apparatus for recognizing, as a moving object, a vehicle approaching a self vehicle, recognizing in particular, another vehicle approaching from behind the self vehicle as a moving object. As shown below, Patent Documents 1-3 show the techniques relating to such moving object recognition.

Patent Document 1 (JP6-130076A) discloses a method for detecting a vehicle traveling obliquely reward of a self vehicle. In this method, the vehicle traveling obliquely rearward is detected based upon an optical flow derived from captured images and a further optical flow corresponding to a traveling velocity of the self vehicle obtained by a vehicle speed sensor. More particularly, the method detects the vehicle, based upon agreement/disagreement between the optical flow obtained by image processing and the further optical flow calculated as motion vector of a time series of images captured at the traveling velocity of the self vehicle. And, in the event of detection of such vehicle traveling obliquely rearward, an image processing/calculating section outputs a drive signal to an alarming section, which in turns issues an alarm.

Patent Document 2 (JP9-86314A) discloses a vehicle rear-side monitoring apparatus capable of effectively recognizing another vehicle even during dark-place traveling such as night traveling or traveling in a tunnel. According to this vehicle rear-side monitoring apparatus, a traveling direction detecting means and a traveling distance detecting means cooperate to detect an amount of movement of the self vehicle, based on which the position of infinite distance for optical flow calculation is varied. That is to say, with this apparatus, by rendering the infinite distance position variable not relying on the image data, sufficient recognition precision is ensured even at the time of dark place traveling. Then, the apparatus alarms the driver through its alarming section, depending on a degree of necessity of alarming calculated based on the calculated optical flow.

Patent Document 3 (JP6-282655A) discloses a technique which allows effective recognition of a moving object present around a self vehicle, based upon an obtained optical flow even when the self vehicle is not traveling straight. In this technique, there is provided a motion direction detecting means for detecting motion direction data of self vehicle, and a group of classified optical flows are corrected based upon this motion direction data. Namely, in this technique, a moving object is detected, with compensation of an influence exerted to the optical flows by the movement of the self vehicle. Then, a relative velocity is calculated from the position of the self vehicle relative to the traveling path and the optical flows. And, if it is determined based on a distance signal from a distance sensor that alarming is needed, an alarming device is activated.

Patent Document 1: JP6-130076A (paragraphs 8-16, FIGS. 3, 4, etc.)

Patent Document 2: JP9-86314A (paragraphs 9, 16-19, 64-66, etc.)

Patent Document 3: JP6-282655A (paragraphs 6-12, etc.)

DISCLOSURE OF THE INVENTION

According to the above-described techniques disclosed in Patent Documents 1-3, optical flows are calculated for the recognition of a vehicle approaching a self vehicle and an alarm is issued to the driver, if needed. An optical flow is a motion vector interconnecting images of a same fixed subject point included in a series of images captured at different times and is calculated based upon correlativity of luminance information of image data. As such, depending on the surrounding situation such as weather, location, time of day, etc., the optical flows cannot sometimes be obtained with precision, due to such factors as low image contrast.

For instance, in the case of rainy weather, water splashed up by the self vehicle may hider the sight from the self vehicle to a vehicle traveling behind, so that only unclear rear images are obtained. In such case, calculation of precision optical flow may prove impossible.

When the calculation of optical flow is inaccurate, the recognition ratio of the moving object too is deteriorated. As a result, the moving object recognizing system may become unable to issue an alarm even in the event of approaching of another vehicle or may issue an alarm erroneously in the event of absence of any approaching vehicle. Especially, if the moving object recognizing system has issued such "false" alarms frequently in the absence of any approaching vehicle, the driver may become distrustful of this moving object recognizing system. As a result, in the event of issuance of "correct" alarm, the driver may neglect this or may stop using the system at all, so that there occurs deterioration in the safety.

The present invention has been made in view of the above-described state of the art. The primary object of the invention is to provide a moving object recognizing apparatus capable of effectively showing reliability of result of image processing involved in moving object recognition and issuing alarms in an appropriate manner when needed.

For accomplishing the above-noted object, according to the present invention, a moving object recognizing apparatus comprises:

a data acquisition unit for acquiring image data obtained in time series by an imaging device;

a recognition unit for recognizing a moving object by executing a plurality of image processing operations on two of the image data obtained at different times, said plurality of image processing operations including an operation of calculating correlativity of a same recognition target pattern; and a reliability calculation unit for calculating recognition reliability indicative of reliability of recognition of the moving object, based upon at least one of the results of the respective image processing operations by the recognition unit.

According to the above-described construction, recognition reliability is calculated based on at least one of the results of the respective image processing operations effected by the recognition unit. The image processing operations by the recognition unit normally include various kinds, but the recognition reliability is calculated based on the result of one of them. As the image processing operations are executed continuously in series, the recognition reliability thus calculated effectively shows the reliability of the results of the image processing operations involved in the moving object recognition. And, if this recognition reliability is used, the moving object recognizing apparatus can effect also a highly reliable reporting operation when needed.

Further, in the moving object recognizing apparatus of the invention, said recognition unit includes;
- a point feature extraction unit for extracting a point feature used as said recognition target pattern from the image data,
- an optical flow calculation unit for calculating optical flows, based upon said point feature present in said two image data obtained at different times, and
- a grouping unit for grouping, from among the optical flows, optical flows belonging to one moving object, under a predetermined condition; and wherein said recognition unit executes the plurality of image processing operations.

In the above, the plurality of image processing operations executed by the recognition unit are executed by the point feature extraction unit, the optical flow calculation unit and the grouping unit. For recognition of a moving object, it is advantageous to use an optical flow which is a motion vector interconnecting a same point feature in different images. Needless to say, for calculation of this optical flow, accurate extraction of point feature is required. Further, for recognition of a single moving object with use of optical flows calculated for a plurality of moving objects or backgrounds, it is advantageous to group the optical flows for the respective moving objects.

Therefore, if the plurality of image processing operations are effected by means of the point feature extraction unit, the optical flow calculation unit and the grouping unit as in the above-described construction, the recognition of moving object can be effected in an advantageous manner. Further, as mentioned above, these operations are effected as a series of operations. Therefore, the recognition reliability calculated based on the result of at least one of these image processing operations will effectively show the reliability of the results of the image processing operations involved in the moving object recognition.

Advantageously, in the moving object recognizing apparatus of the invention,
said optical flow calculation unit calculates said optical flow, based upon;
- a target area around said point feature in previously acquired image data, and
- an area included in image data acquired with lapse of a predetermined period after said previously acquired image data and having the highest correlativity value relative to said target area; and said reliability calculation unit calculates, based on said correlativity value, optical flow reliability indicative of reliability of said calculated optical flow and then calculates said recognition reliability with using said optical flow reliability.

The optical flow calculation unit calculates the optical flow with utilizing the correlativity value between two images. As described above, there sometimes occurs variation in the image quality, e.g. contrast of image captured in an environment where the image is captured. Therefore, variation occurs also in the correlativity value in the calculation of the optical flow. As the correlativity value tends to decrease in association with reduction in image quality, optical flow reliability can be calculated, based upon this correlativity value. As described above, since the recognition reliability is calculated based on the result of at least one image processing operation, the moving object recognizing apparatus can calculate the recognition reliability with use of the optical flow reliability.

Preferably, in the moving object recognizing apparatus of the present invention, said grouping unit groups, as the optical flows belonging in one moving object, particular optical flows among said calculate optical flows, which satisfy the following conditions;
said each particular optical flow has an extension which is convergent to a single vanishing point within a predetermining convergence range; and
said each particular optical flow has a same external ratio within a predetermined tolerance range, said external ratio being relative to one end of said particular optical flow as an external dividing point and being determined between said particular optical flow and a line segment extending beyond the other end of said particular optical flow to said vanishing point;
said reliability calculation unit calculates grouping reliability indicative of reliability of said grouped optical flows belonging to said one moving object, based upon either one or both of convergence of the grouped optical flows and the total number of the grouped optical flows; and
said reliability calculation unit calculates said recognition reliability with using said grouping reliability.

The grouping unit groups optical flows belonging to one moving object, based upon convergence of an extension line of the optical flow to the vanishing point and an external ratio. Standard camera is of the perspective camera model and an image perspective-transformed into a two-dimensional image from the three-dimensional space with using this camera can be grouped under the above-described conditions. In order to satisfy these conditions, it is required that the moving body is in translation motion without rotation between two two-dimensional images. During a time difference between two-dimensional images captured in time series, if the distance moved at the relative velocity between the moving object and the imaging device is sufficiently small, the movement of the moving object can be taken as a translational motion.

If the convergence to the vanishing point is low or there exists significant discrepancy in the external ratio, this means that the possibility of the optical flows as a collection of motion vectors associated with a translational motion, belonging to a single moving object is low. As described above, since the recognition reliability is calculated based upon the result of at least one image processing operations, the moving object recognizing apparatus can calculate the recognition reliability with using the grouping reliability indicative of the reliability of the grouping.

Preferably, in the above construction, said reliability calculation unit may calculate said convergence, based upon either one or both of deviation of each optical flow grouped according to each grouping criteria and dispersion of said deviation.

If the convergence to the vanishing point or the discrepancy in the external ratio of the optical flow is quantified as deviation relative to each grouping criteria or as dispersion of this deviation, it becomes possible for the reliability calculation unit to effectively show the reliability of image processing involved in the moving object recognition.

Further, preferably, in the moving object recognizing apparatus of the present invention, said point feature extraction unit calculates a point feature amount indicative of a characteristic property of said point feature in the image data;
said reliability calculation unit calculates a point feature reliability indicative of reliability of the point feature extracted based upon said point feature amount; and
said recognition reliability is calculated with using the point feature reliability.

For calculation of optical flows with good precision, it is important to extract the point feature, as the recognition target pattern, from the image data with accuracy. Compared with its surrounding image, the point feature has a characteristic property (uniqueness) such as increased luminance. Needless to say, this characteristic property is affected also by the quality of this image data. Therefore, in extracting the point feature, there is calculated a point feature amount which is a quantitative representation of the characteristic property. If the point feature amount is small, this means that the point feature has a low or weak characteristic property, so that there is greater possibility of confusion with other point features. As described above, since the recognition reliability is calculated based upon the result of at least one of image processing operations, the moving object recognizing apparatus can calculate the recognition reliability with using the point feature reliability indicative of the reliability of the point feature.

Preferably, in the moving object recognizing apparatus of the present invention, said recognition unit executes the image processing operations in time series, according to the image data acquired in time series;

said reliability calculation unit calculates the recognition reliability according to said image processing operations executed in time series; and the recognition reliability calculated at said reliability calculation unit based upon the latest image processing operation is calculated, based upon;

the result of the latest image processing operation, and previously calculated recognition reliability calculated with using the result of the previous image processing operation.

According to the above-described construction, the recognition reliability is calculated with temporal continuity, based upon the result of the latest image processing operation and the result of the previous image processing operation. Therefore, the reliability calculation unit can calculate the recognition reliability with precision, with suppressing adverse effect from accidental image data disturbance.

Further, the moving object recognizing apparatus of the present invention can calculate the recognition reliability with using at least one of the followings.

Namely, said reliability calculation unit calculates the recognition reliability with using at least one of the group consisting of a plurality of primary intermediate reliabilities which are calculated based on the respective results of a plurality of the image processing operations including the image processing operations executed by said point feature extraction unit, said optical flow calculation unit, and said grouping unit and which indicate reliabilities of the results of the respective image processing operations;

a secondary intermediate reliability which is one selected from said primary intermediate reliabilities or a fusion of two or more of the primary intermediate reliabilities;

an average reliability obtained by averaging the secondary intermediate reliabilities of those optical flows whose secondary intermediate reliabilities are included within a predetermined higher range;

an object reliability calculated based upon correlativity between a size permissible for the moving object as one recognition target and a physical size delimited by an area where the optical flows grouped as belonging to the moving object are present, said object reliability indicating a degree of certainty whether the recognized moving object is truly the moving object to be recognized or not; and a position precision reliability calculated based upon the degree of dispersion of the positions of the optical flows grouped as belonging to the one recognized moving object and indicating the degree of certainty of the position of this recognized moving object.

With the above construction, with combinational use of the results of the plurality of image processing operations, the moving object recognizing apparatus quantities the "certainty" of the moving object to be recognized, thus calculating the recognition reliability.

Further, preferably, in the moving object recognizing apparatus of the present invention;

wherein said recognition unit calculates the instantaneous velocity of the moving object at each time and the average velocity thereof, based upon time differences of the image data acquired in time series and the position of the moving object obtained by executing the image processing operations in time series with using the image data; and said reliability calculation unit calculates continuity reliability indicative of the certainty whether the recognized moving object remains the same through the image processing operations executed in time series, based upon deviation amounts of the instantaneous velocities relative to the average velocity; and the recognition reliability is calculated, with using the continuity reliability.

A same single moving object does not change much in its velocity or position. Therefore, with use of the continuity reliability indicative of the certainty of a same moving object being recognized, the reliability calculation unit can effectively calculate the recognition reliability.

Further, preferably, the moving object recognizing apparatus of the present invention may include a reporting unit for reporting the recognition result of the moving object, in accordance with the recognition reliability.

With this construction, there is provided a moving object recognizing apparatus which is capable of effectively reporting the result of recognition of the moving object and capable also of enabling reporting in an appropriate manner when needed.

Further, the reporting unit of the moving object recognizing apparatus of the invention may report the recognition result of the moving object in the following manners.

Namely, the reporting unit reports the recognition result, in an alarm mode enabling speedy recognition by the user through at least either one of the visual perception and the auditory perception, if the recognition reliability is greater than a predetermined first threshold value; or reports the recognition result, in a caution mode of lower recognizability than the alarm mode, if the recognition reliability is below the first threshold value and greater than a second threshold value set to be smaller than the first threshold value; or does not report the recognition result at all, if the recognition reliability is below the second threshold value.

With the above construction, the reporting unit can effect the reporting in an appropriate manner according to the need, i.e. in the alarm mode or caution mode. Further, in the case of very low recognition reliability such as when the recognition reliability is below the second threshold value, the reporting unit does not effect the reporting at all. Therefore, such inconvenience as the moving object recognizing apparatus issues an alarm even in the absence of any approaching moving object. Further, in case the recognition reliability is relative low as being under the first threshold value, the reporting is made in the caution mode with lower recognizability than the alarm mode. Therefore, the safety can be improved.

BEST MODE OF EMBODYING THE INVENTION

Next, an embodiment of the present invention will be described with reference to the drawings. Here, there will be described an example wherein the moving object recognizing apparatus of the invention is provided for use in a vehicle (self vehicle) for recognizing another vehicle approaching the self-vehicle.

Figure 1:
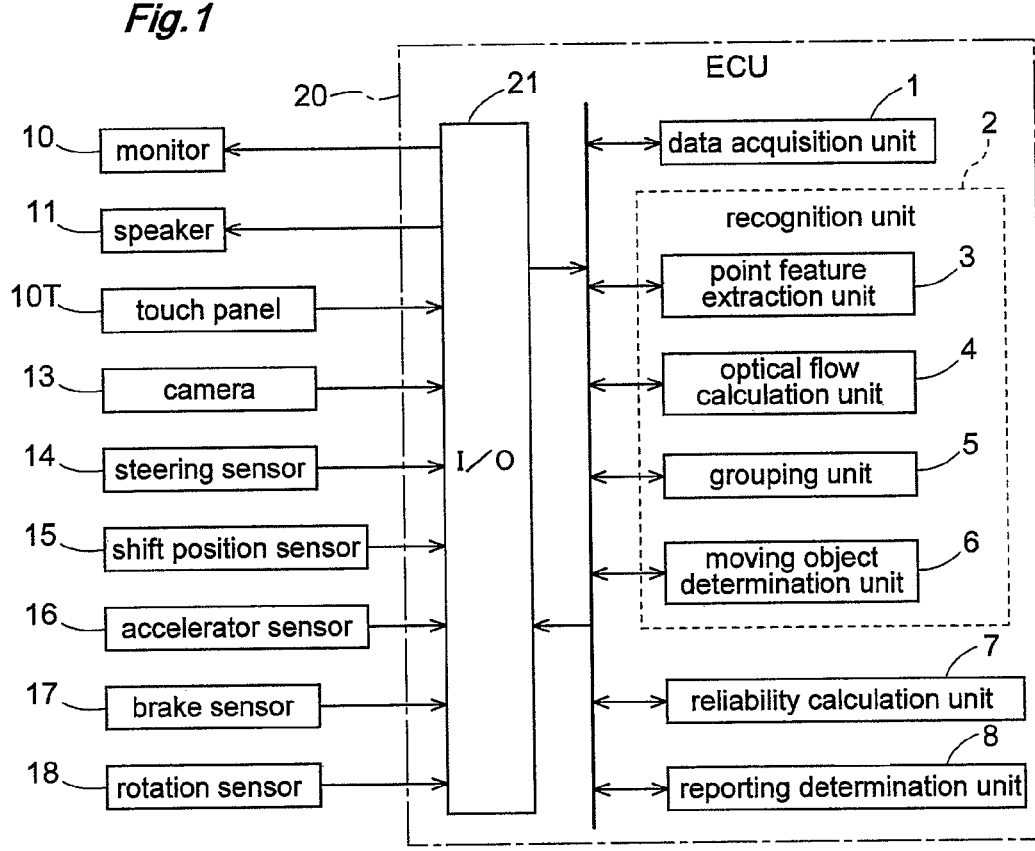
[FIG. 1] a block diagram schematically showing the logic construction of a moving object recognizing apparatus according to the present invention.

FIG. 1 is a block diagram schematically showing the logic construction of a moving object recognizing apparatus according to the present invention. And, FIG. 2 is a perspective view showing a driver's seat made visible by cutting out a portion of a vehicle.

Figure 2:
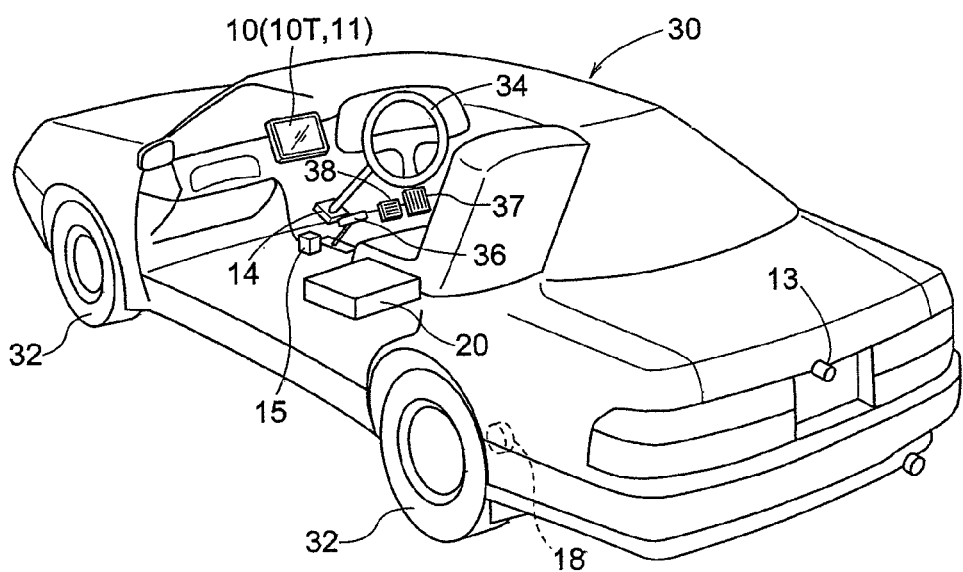
[FIG. 2] a perspective view showing a driver's seat made visible by cutting out a portion of a vehicle.

The moving object recognizing apparatus of the present invention comprises an ECU (electronic control unit) 20 as a core component thereof as shown in FIG. 2 and is mounted on a vehicle 30. The ECU 20, as shown in FIG. 1, includes an input/output interface 21 for inputting/outputting information and a microprocessor for processing information from this input/output interface 21. Needless to say, a portion or the entirety of the input/output interface 21 may be included within the microprocessor. The ECU 20 is comprised of an electronic circuitry including the microprocessor as a core component thereof and includes a storage unit comprised of memories or registers and provided separately of or incorporated within the microprocessor.

Near the driver's seat and at an upper position of the console, there is provided a monitor 10 having a touch panel 10T on its display face. The monitor 10 is of a liquid-crystal type having backlight. Needless to say, this monitor 10 can be of a plasma display type or a CRT type. The touch panel 10T can be a pressure-sensitive type or electrostatic type and is capable of outputting the touched position of e.g. a finger as location data. The monitor 10 includes also a speaker 11, but this speaker 11 can be provided at a separate place such as the inner side of a door. Incidentally, as this monitor 10, a monitor provided originally as a display unit of a navigation system can be co-used.

At the rear end of the vehicle 30, there is mounted a camera 13 (imaging unit). This camera 13 is a digital camera incorporating such imaging elements as CCD (charge coupled device) or CIS (CMOS image sensor), so that the camera outputs the captured image information in realtime as video information in time series. As this camera 13, a camera provided originally for use in the rear view monitoring for assisting parking of the vehicle 30 can be co-used. In this case, the camera 13 will be a wide-angled camera having a horizontal viewing angle ranging from 120 to 140 degrees, so this camera will be installed with a descending vertical angle relative to its optical axis and oriented toward the rear side of the vehicle 30.

The vehicle 30 mounts also various kinds of sensors for detecting operational conditions and moving conditions of the vehicle 30. Specifically, in a steering system of a steering wheel 34, a steering sensor 14 is provided for determining a steering direction and a steering amount. In an operational system of a shift lever 36, a shift position sensor 15 is provided for detecting a shift position. In an operational system of an accelerator pedal 37, an accelerator sensor 16 is provided for determining its operational amount. In an operational system of a brake pedal 38, a brake sensor 17 is provided for detecting presence/absence of a braking operation.

Further, as a moving distance sensor of the vehicle 30, there is provided a rotation sensor 18 for determining a rotational amount of at least one of front wheels and rear wheels. Needless to say, it is also possible to detect the moving amount of the vehicle 30 based on a rotational amount of the driving system in a speed changing mechanism.

As shown in FIG. 1, the moving object recognizing apparatus of the present invention includes various functional units, such as a data acquisition unit 1, a recognition unit 2, a reliability calculation unit 7 and a reporting determination unit 8. Further, the recognition unit 2 includes various kinds of functional units, i.e. a point feature extraction unit 3, an optical flow calculation unit 4, a grouping unit 5 and a moving object determination unit 6. Each one of these functional units is connected to the input/output interface 21. These connections are realized e.g. with using data buses, address buses, control busses, a memory, a disc device (hard disc, optical, magnetic, magnet-optical device, etc) provided inside/outside the microprocessor. For instance, for a program to be executed by the microprocessor or temporary storage of acquired image data, the internal/external memory or disc drive device will be used. As these connections are known, so for the purpose of facilitated explanation, detailed illustration and explanation thereof will be omitted.

The data acquisition unit 1 is a functional unit for acquiring image data captured in time series by the camera 13 (imaging device).

The recognition unit 2 is a functional unit for effecting recognition of a moving object by executing a plurality of image processing operations including an operation of calculating correlativity of a same recognition target pattern, on two image data acquired at different times.

The reliability calculation unit 7 is a functional unit for calculating recognition reliability indicative of reliability of recognition of the moving object, based upon result of at least one of the respective image processing operations effected by the recognition unit 2.

The reporting determination unit 8 is a functional unit for reporting recognition result of the moving object via a repotting device such as the monitor 10 or the speaker 11. Hence, the reporting determination unit 8 functions as a "reporting unit" in the present invention for effecting reporting output to the reporting device. Further, any other reporting device for effecting reporting output to the driver can also act as the "reporting unit" in the present invention.

The point feature extraction unit 3 is a functional unit for extracting a point feature as the recognition target pattern from the image data.

The optical flow calculation unit 4 is a functional unit for calculating an optical flow, based upon the point feature in two image data acquired at the different times.

The grouping unit 5 is a functional unit for effecting grouping optical flows belonging to a single moving object based on predetermined conditions, from the optical flows.

In the above, the respective functional units have been described generally; while the details thereof will be described later herein.

The data acquisition unit 1 effects synchronizing separation and A/D conversion on the image signals outputted from the camera 13, thereby to acquire 30 frames amount of image data per second, for instance. Needless to say, depending on the image processing capacity of the recognition unit 2, the predetermined interval between the image data to be acquired in time series in sequence can vary appropriately, such as 15 frames or 60 frames per second, etc. The acquired image data will be stored in a frame memory (not shown) in the ECU 20, to be read out therefrom as needed for use. When the vehicle 30 is traveling, during the predetermined interval between the image data acquisitions, the vehicle 30 or a moving object as a recognition target will move by a predetermined distance corresponding to the velocity of the vehicle 30 or the relative velocity relative to the vehicle 30. For instance, the image data after the predetermined distance movement is an image projected on a first image plane and the image data before the predetermined distance movement is an image projected on a second image plane. The vehicle 30 and the moving object have large inertia, and the predetermined distance is short sufficiently. Therefore, the image data on the first image plane and the image data on the second image plane can be taken as having "geometric relation based on translational camera motion".

Figure 3:
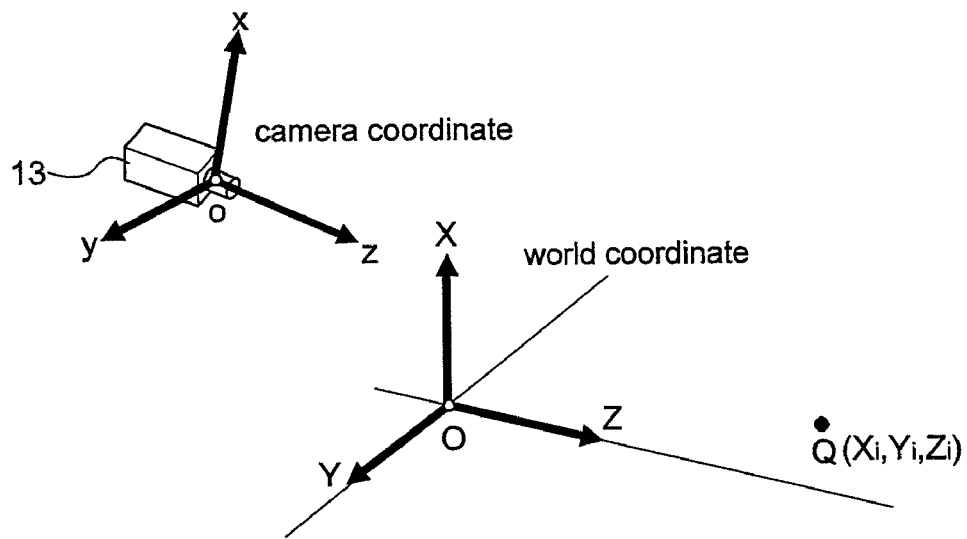
[FIG. 3] an explanatory view illustrating relationship between world coordinate and camera coordinate.
Figure 4:
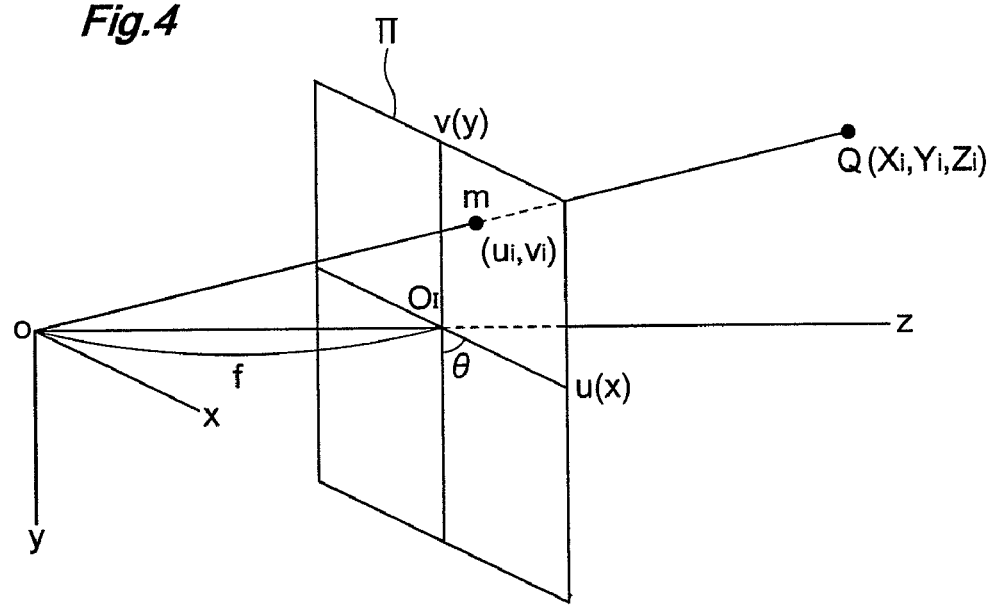
[FIG. 4] an explanatory view illustrating relationship between the camera coordinate and image coordinate of a captured image.

The recognition unit 2 recognizes the moving object, with utilization of this geometric relationship. FIG. 3 is an explanatory view illustrating relationship between world coordinate (X, Y, Z) and camera coordinate (x, y, z). FIG. 4 is an explanatory view illustrating relationship between the camera coordinate and image coordinate.

A point Q in the three-dimensional space has coordinate values (Xi, Yi, Zi) in the world coordinate.

The image coordinate (u, v) is a two-dimensional coordinate which is distant from the origin (o) of the camera coordinate by the focal length of the camera along the z-axis direction in the plane Π (large pi: projection plane, image plane) perpendicular to the z-axis coincident with the optical axis of the camera coordinate. The intersection point between the projection plane and the optical axis is the image center $O_I$. Further, ideally, the u-axis of the image coordinate is parallel with the x-axis of the camera coordinate and v-axis is parallel with the y-axis of the camera coordinate. In the figure, θ represents the angle formed between the u-axis and the v-axis. Here, explanation will be continued, on the assumption that the image coordinate (u, v) is an orthogonal coordinate and θ is 90 degrees.

A standard camera is a perspective camera model, represented by the pinhole camera. With this camera, the point Q in the three-dimensional space is converted into a two-dimensional image. The point Q is projected onto a projection plane Π as shown in FIG. 4. A rotation matrix R (Formula (1)) is the conversion matrix relating to the posture of the camera coordinate relative to the world coordinate. A translation vector S (Formula (2)) is the conversion matrix for the position of the camera coordinate relative to the world coordinate. And, a camera internal matrix A (Formula (3)) contains camera internal parameters. Then, the perspective camera matrix P is expressed by the following Formula (4).

$$R = \begin{bmatrix} r_{11} & r_{12} & r_{13} \\ r_{21} & r_{22} & r_{23} \\ r_{31} & r_{32} & r_{33} \end{bmatrix}, \quad (1), (2), (3)$$

$$S = \begin{bmatrix} s_1 \\ s_2 \\ s_3 \end{bmatrix},$$

$$A = \begin{bmatrix} fk_u & -fk_u \cot\theta & u_0 \\ 0 & fk_v/\sin & v_0 \\ 0 & 0 & 1 \end{bmatrix}$$

$$P = A[R \ S] \quad (4)$$

Incidentally, in the camera internal matrix A, $(u_0, v_0)$ are the image center coordinates, $k_u$ and $k_v$ are scale factors (the number of pixels of the imaging element per unit length) for the u direction and v direction.

Figure 5:
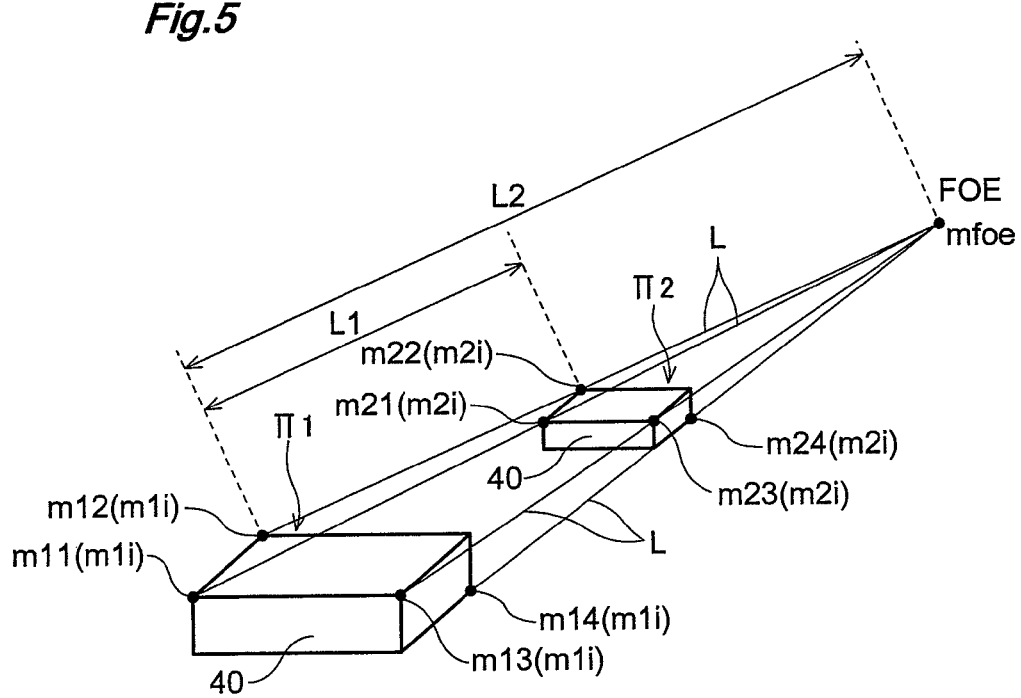
[FIG. 5] a view explaining the basic concept of optical flow.

FIG. 5 is a view for explaining the basic concept of optical flow. For facilitating the explanation, a moving object 40 as a recognition target, is simulated as a rectangular parallelepiped. As may be apparent from FIG. 4, the conversion image to the captured image Π (projection plane, image plane) differs, depending on the positional relationship between the camera and the object. FIG. 5 shows two image frames $\Pi_1$ and $\Pi_2$ captured in time series, when the moving object 40 is approaching the camera. The latest captured image frame $\Pi_1$ corresponds to the first image plane described above and the previously captured image frame $\Pi_2$ corresponds to the second image plane described above. For the sake of simplicity of explanation, as the captured image Π, there is shown only the rectangular solid as the recognition target object.

Points m11 through m14 on the two dimensional image comprise the point features m1$i$ (i=1, 2, . . . n) on the latest captured image frame $\Pi_1$. Points m21 and m24 comprise the point features m2$i$ (i=1, 2, . . . n) on the previous captured image frame $\Pi_2$. When the latest captured image frame $\Pi_1$ is shown with the previous captured image frame $\Pi_2$ being superposed therewith, the vector (motion vector) extending from the point feature m2i to the point feature m1i is called an optical flow.

Both the vehicle 30 mounting the camera 13 and the moving object 40 have large inertia and the time difference between the image data captured in time series is minimal, so the movement of the moving object 40 relative to the camera coordinate can be taken as a translational motion without any rotational component R, as described above.

Here, optical flows of the single moving object 40 are extended. These extended straight lines L intersect at one point, which is the focus of expansion: FOE, which is defined as the so-called point at infinity or the vanishing point. That is, each point feature of the moving object 40 which translates in the three-dimensional space has a common focus of expansion FOE in the image plane. Needless to say, if different moving objects are translating in non-parallel manner, the respective optical flows thereof will converge at different foci of expansion.

For the optical flow of a single object which is translating in the camera coordinate, if the captured image is the perspective-converted image as shown in FIG. 4, relationship expressed by the following Formula (5) is established.

$$\frac{m1i - m2i}{m1i - mfoe} = C \tag{5}$$

In the Formula (5), m1i is the coordinate in the image of the point feature in the latest captured image $\Pi_1$, m2i is the coordinate in the image of the point feature in the previous captured image $\Pi_2$, mfoe is the coordinate of the focus of expansion in the image, and C is a constant.

That is to say, supposing one terminal end of the optical flow (point feature m1$_i$ in the latest image) is an external dividing point, an external ratio C between a line segment (L2:m1i–mfoe) extending beyond the other terminal end (point feature m2i in the past image) to the focus of expansion and this optical flow (L1:m1i–m2i) is equal within a predetermined tolerance (e.g. ±α).

Incidentally, for the external ratio, e.g. the focus of expansion:mfoe, may be set as the external dividing point.

The recognition unit 2 recognizes the moving object 40 with utilizing the above-described basic concept of optical flow. Next, the procedure of the moving object recognition will be explained with reference also to the flowchart shown in FIG. 6.

[Image Data Acquiring Step (#1 in FIG. 6)]

As described hereinbefore, the data acquisition unit 1 acquires image data by effecting synchronizing separation and A/D conversion on the image signals outputted from the camera 13. As the camera 13 employs a wide-angle lens, a distortion has occurred in the captured images. Further, the camera 13 has lower resolution for distant object, and its installed position is low. Because of these reasons, the captured images are image data not advantageous for executing image processing operations in correlativity with the world coordinate. Therefore, prior to the recognition operation by the recognition unit 2, a variety of correcting operations are effected on the captured images. These correction operations (normalization operations) may be effected at the image data acquisition unit 1 or at the recognition unit 2. Or, these may be effected by a separately provided functional unit. In the instant embodiment, there will be described a case wherein the following image normalization operation is effected by the image data acquisition unit 1.

[Image Normalizing Step (#2 in FIG. 6)]

The image data acquisition unit 1 effects a distortion correcting operation according to the lens characteristics, on the image data (captured image data) which was outputted from the camera 13 and subjected to a predetermined treatment and stored in the frame memory. And, the resultant corrected image data (distortion-corrected image data) is stored in a different frame memory. The corrected image data comprises a perspective projection image as shown in FIGS. 3 and 4. The correction is effected such that coordinates (x, y) in the corrected image data and coordinates (x', y') in the image data prior to the correction may satisfy relationships expressed by the following conditions shown by Formulae (6) through (9) below.

$$q = \sqrt{(x - x_0)^2 + (y - y_0)^2} \tag{6}$$

$$q' = f_n(q) \tag{7}$$

$$x' = \frac{q'}{q}(x - x_0) + x'_0 \tag{8}$$

$$y' = \frac{q'}{q}(y - y_0) + y'_0 \tag{9}$$

Here, ($x_0$, $y_0$) are distortion center coordinates in the corrected image data and ($x'_0$, $y'_0$) are distortion center coordinates in the image data before the correction.

As the camera 13 is installed with a descending vertical angle, the data can be converted into an image with the optical axis (z axis in FIG. 4) of the camera 13 being set horizontal. In this case, the conversion is effected so as to satisfy the following Formulae (10), (11) with (x', y') being the coordinates of the image data before the conversion and (x'', y'') being the coordinates of the image data after the conversion.

$$x'' = \frac{w_{11}(x' - x'_0) + w_{12}(y' - y'_0) + w_{13}k_z + w_{14}}{w_{31}(x' - x'_0) + w_{32}(y' - y'_0) + w_{33}k_z + w_{34}} \cdot \frac{k_z}{\cos\beta} + x''_0 \tag{10}$$

$$y'' = \frac{w_{21}(x' - x'_0) + w_{22}(y' - y'_0) + w_{23}k_z + w_{24}}{w_{31}(x' - x'_0) + w_{32}(y' - y'_0) + w_{33}k_z + w_{34}} \cdot \frac{k_z}{\cos\beta} + y''_0 - e0 \tag{11}$$

where, β is the tilt angle (angle descending from the horizontal in the instant example), $k_z$ is the scale factor, e0 is the distance between the focus of expansion FOE and the image center before the image conversion and W=[$w_{ij}$] represent the image conversion matrix.

[Image Processing Area Setting Step (#3 in FIG. 6)]

The recognition unit 2 effects the recognition of the moving object 40, with using the image data corrected as described above. In this, however, if the recognition were effected on the entire area of the image data, the amount of calculation would be enormous. Therefore, an area to be subjected to the image processing operation will be set, depending on the situation. This area setting operation may be effected before a series of operations to be described later, i.e. a point feature extraction, optical flow calculation, grouping, etc, or may be effected before the optical flow calculation after the point feature extraction. That is, the area setting operation may be effected at any desired time, depending on the image processing operations to be effected. As the moving object recognition is effected sequentially and in time series on the image data acquired in time series, the target area will be set, depending on the situation of this recognition operation.

[Point Feature Extracting Step (#4 in FIG. 6)]

The point feature extraction unit 3 of the recognition unit 2 extracts a point feature as a recognition target pattern, in order to effect inter-image comparison from the corrected image data. And, the optical flow calculation unit 4 calculates an optical flow based on the point features in data of two images captured at different times. In this way, the extraction of point feature and calculation of optical flow are closely related to each other. Therefore, the process will be explained with reference also to the generation principle of optical flow.

If the luminance of the point (x, y) in the image data at time t is given as I (x, y, t), the following Formulas (12), (13) represent spatial luminance gradients of the point (x, y) and the following Formula (14) represents the temporal luminance gradient thereof. And, Formulas (15), (16) represent the apparent velocity vectors.

$$Ix = \frac{\partial I}{\partial x}, Iy = \frac{\partial I}{\partial y}, It = \frac{\partial I}{\partial t} \quad (12), (13), (14)$$

$$Vx = \frac{dx}{dt}, Vy = \frac{dy}{dt} \quad (15), (16)$$

Using the Formulas (12) through (16), the constraint equation of the optical flow is given as the following Formula (17).

$$Ix\,Vx + Iy\,Vy + It = 0 \quad (17)$$

However, with the Formula (17) alone, the optical flow cannot be determined uniquely. Then, in the KLT method (Kanade-Lucas-Tomasi tracker), there is employed an assumption that the optical flow is fixed in a local area in the density pattern of a single object. And, the search for the point feature (target point) is effected as an energy minimization problem by the relaxation method. This search method is described in details in Bruce D. Lucas, Takao Kanade: "An Interactive Image Registration Technique with an Application to Stereo Vision", In IJCAI, 1991 or in Carlo Tomashi, Takeo Knade: "Detection and Tracking of Point Features", Technical Report CMU-CS-91-132 April 1991. Therefore, only a brief description will be given below and detailed explanation will be omitted.

According to the KLT method, for the search of point feature, a KLT feature amount is calculated for each corresponding point. And, if this KLT feature amount exceeds a predetermined threshold value $\lambda_{TH}$, this corresponding point is extracted as the point feature. The KLT feature amount is calculated as follows.

From the Formulas (12), (13), the moment matrix of the spatial luminance gradient $\Box I$ (Formula (18)) of the point (x, y) is given as the Formula (19).

$$\nabla I = \begin{bmatrix} Ix \\ Iy \end{bmatrix} \quad (18)$$

$$M(x, y) = \begin{bmatrix} Ix^2 & IxIy \\ IyIx & Iy^2 \end{bmatrix} \quad (19)$$

The fixed value $\lambda$ in the moment matrix M (Formula (19)) can be obtained as a quadratic equation solution for $\lambda$ in the following Formula (20), with E being the unit matrix.

$$|M - \lambda E| = 0 \quad (20)$$

In this example, the solution of the Formula (20) is obtained as $\lambda_1$ and $\lambda_2$ in the following Formulas (21), (22).

$$\lambda_1 = \frac{Ix^2 + Iy^2}{2} + \sqrt{\frac{(Ix^2 - Iy^2)^2}{4} + (IxIy)^2} \quad (21)$$

$$\lambda_2 = \frac{Ix^2 + Iy^2}{2} - \sqrt{\frac{(Ix^2 - Iy^2)^2}{4} + (IxIy)^2} \quad (22)$$

And, for instance, as shown in the following Formula (23), if one of the obtained feature amounts $\lambda$ ($\lambda_1$, $\lambda_2$) exceeds the predetermined threshold value $\lambda_{TH}$, this corresponding point is extracted as the point feature.

$$\min(\lambda_1, \lambda_2) > \lambda_{TH} \quad (23)$$

As the KLT amount, the value per se of either $\lambda_1$ or $\lambda_2$ can be used, as shown in the Formula (23) above, a ratio between $\lambda_1$ and $\lambda_2$, such as "$\lambda_1/\lambda_2$," may be used. In this way, the point feature extraction unit 3 calculates a feature amount indicative of the uniqueness of the point feature.

[Optical Flow Calculating Step (#5 in FIG. 6)]

The optical flow calculation unit 4 sets a template around the feature point obtained as above and searches for an area having high correlativity with this template, from the subsequent image in the time series. (template matching). As the result of the search, its movement vector is obtained as a motion vector (optical flow). As a method of such template matching, a normalized cross correlation technique (NCC) can be used. This normalized cross correlation technique is a technique which allows stable template matching through restriction of influence by ambient illumination. The normalized cross correlation technique first calculates an average luminance of each entire image of the image data obtained lately and previously in time sequence, and then executes the normalization by subtracting this average luminance form the original image data. With this, the normalized cross correlation technique eliminates any luminance difference between the images, thereby to search a position having the highest correlativity with the template with high precision.

In the normalized cross correlation technique, a template image T (i, j) having ($M_T \times N_T$) pixels is moved on the pixels present within a search area, thereby to search a point in the template image which point has the maximum correlativity coefficient (correlativity value) $R_{NCC}$ (a, b) in the following Formula (24). In the Formula (24), the top bar on variable represents an average value within this area.

[Mathematical Formula 12]

$$R_{NCC}(a, b) = \frac{\sum_{i=0}^{M_T-1} \sum_{j=0}^{N_T-1} \{I_{(a,b)}(i, j) - \bar{I}\}\{T(i, j) - \bar{T}\}}{\sqrt{\sum_{i=0}^{M_T-1} \sum_{j=0}^{N_T-1} \{I_{(a,b)}(i, j) - \bar{I}\}^2} \sqrt{\sum_{i=0}^{M_T-1} \sum_{j=0}^{N_T-1} \{T(i, j) - \bar{T}\}^2}} \quad (24)$$

Incidentally, (a, b) represents the position of the template image T within the image in the search area and $I_{(a, b)}$ (i, j) represents a partial image within the image in the search area.

As other examples of the template matching technique, there are a variety of techniques including SSDA (sequential similarity detection algorithm), the least squares matching, etc. In this example, there has been described a case wherein the normalized cross correlation technique which technique is relatively less affected by change in the environment is employed and a method of extracting a correlativity value by this technique. In the cases of using other techniques, the correlativity value will be obtained by the respective such other methods.

In the template matching, if all of the image data are searched, the amount of calculation will be enormous. Therefore, as described hereinbefore in the explanation of the image processing area setting step (#3), it will be advantageous to set the search area, depending on the situation. For instance, with assumption of a movement restraint amount of the moving object, the search may be done for only such restrained area, whereby the calculation amount can be reduced. Specifically, it will be advantageous to set the image processing area so that no search other than in the approaching direction of the moving object is effected. It will be advantageous also to set the image processing area such that no search is done in areas that the moving object is hardly believed to reach physically, based upon the movement amount determined in the past.

Figure 6:
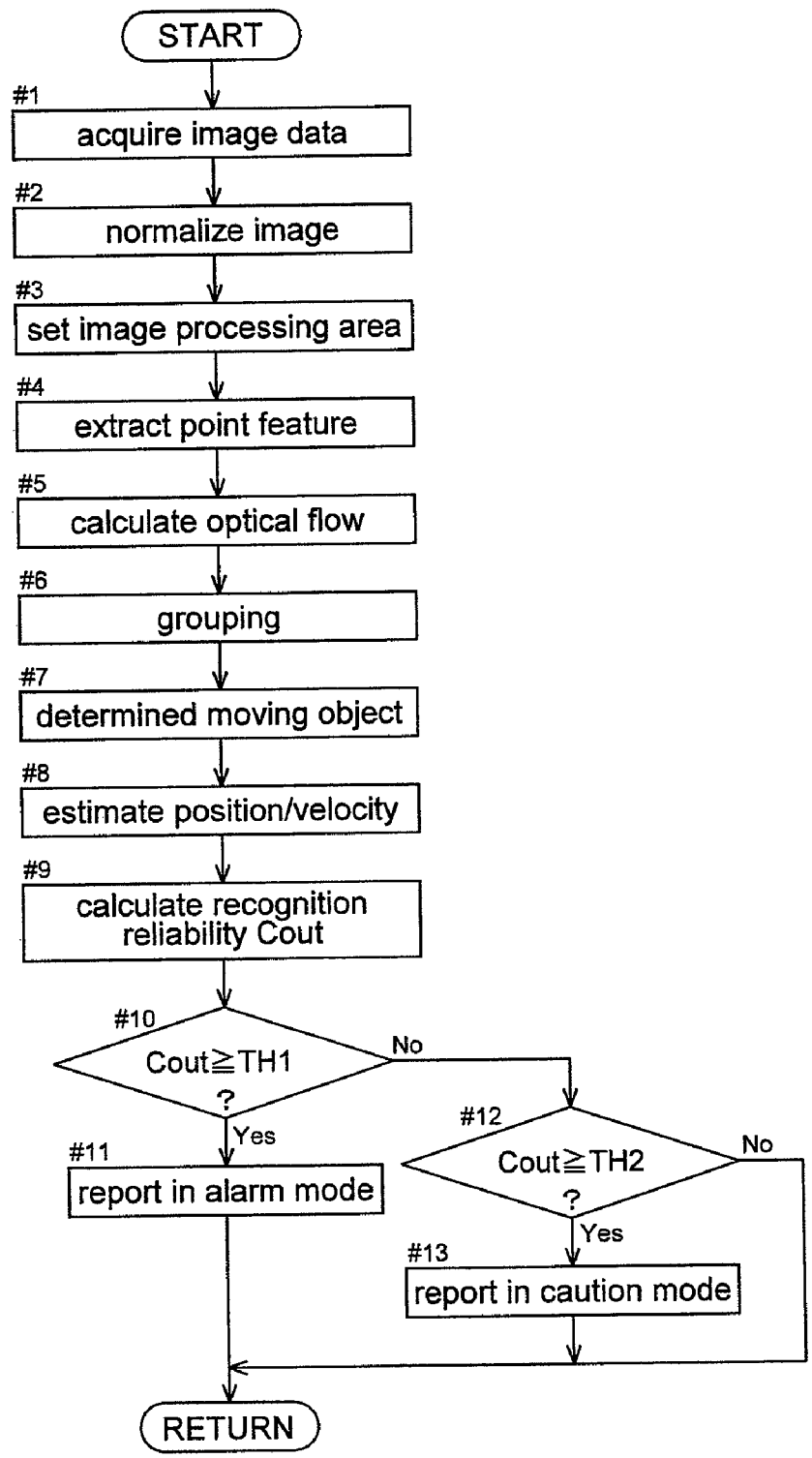
[FIG. 6] a flowchart illustrating one example of a series of operations effected by the moving object recognizing apparatus.

As may be apparent also from the flowchart in FIG. 6, the recognition operation of the moving object is effected in repetition, in accordance with the image data acquired in time sequence. Therefore, it is possible to restrict the search area in advance in the image processing area setting step, according to the position of the moving object recognized in the previous flow.

Further, a moving object located near the camera 13 has a large movement amount on the image data. So, this moving object may be subjected to a hierarchization operation according to which detailed search is effected after restricting the search area.

[Grouping Step (#6 in FIG. 6)]

The grouping unit 5 effects grouping of optical flows belonging to one moving object, under predetermined conditions. Here, the "predetermined conditions" or requirements refer to the following two conditions, as described hereinbefore with reference to FIG. 5.

The first condition or requirement is that extension lines L of the optical flow converge at the single point, i.e. the vanishing point FOE (mfoe) within the predetermined constraint range.

The second condition or requirement is that with one terminal end (m1$i$) of the optical flow being an external dividing point, an external ratio between a line segment L2 extending beyond the other terminal end (m2$i$) to the focus of expansion (mfoe) and this optical flow L1 has a same value C within the predetermined tolerance α.

The Formula (5) representing these predetermined conditions include the two parameters, i.e. the focus of expansion (foe) and the external ratio constant C. Further, the other requirement for the grouping is that for each optical flow, the parameter has a similar value within the predetermined tolerance α. Then, the Formula (5) is modified based on Formulas (25) through (27) into an Formula (28), which is a linear formula for the two variables.

$$m1i - m2i = C \cdot (m1i - mfoe) = C \cdot m1i - C \cdot mfoe \quad (25)$$

$$dmi = m1i - m2i, \; C1 = C \cdot mfoe \quad (26),(27)$$

$$dmi = C \cdot m1i - C1 \quad (28)$$

Figure 7:
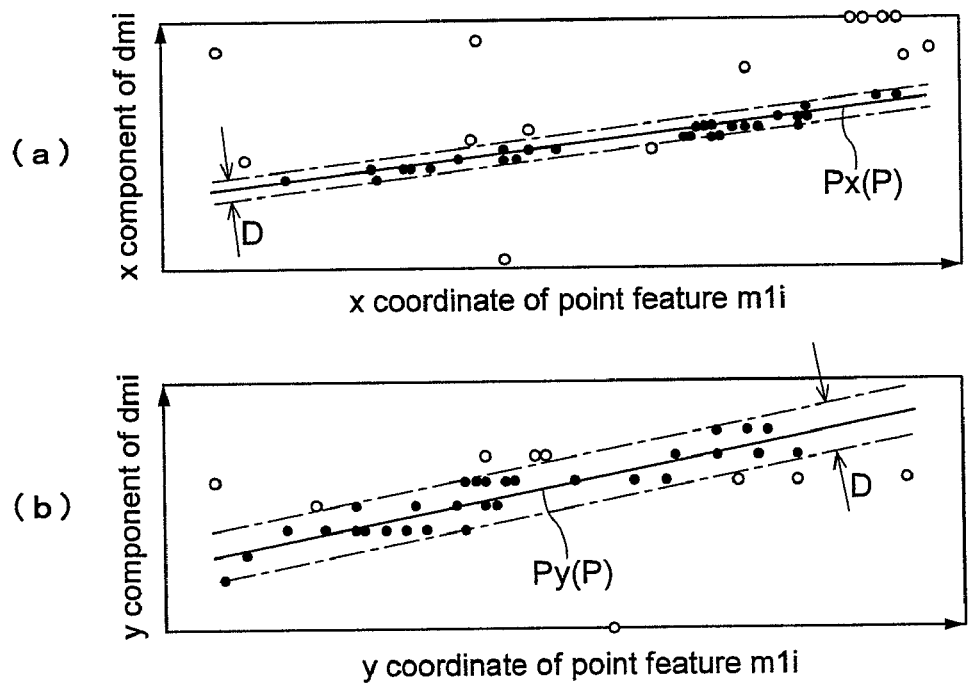
[FIG. 7] a graph showing the relationship between a point feature and respective x-components and y-components of an optical flow according to a formula with modification in the external ratio between the optical flow and the start point.

FIG. 7 shows a graph of relationship between each x component and y component of each optical flow (dmi) and the point feature (m1$i$). Of the dots plotted as shown in FIG. 7, the dots located on a straight line (parameter straight line P) with a predetermined tolerance D can be grouped as an optical flow belonging to the same moving object. As methods of fitting the parameter straight line P to the plotted dots, there are various methods such as the Hough conversion, the least squire technique, etc. In this example, there is employed the RANSAC (RANdom Sample Consensus) which requires much less amount of calculation and has high noise resistance.

Figure 8:
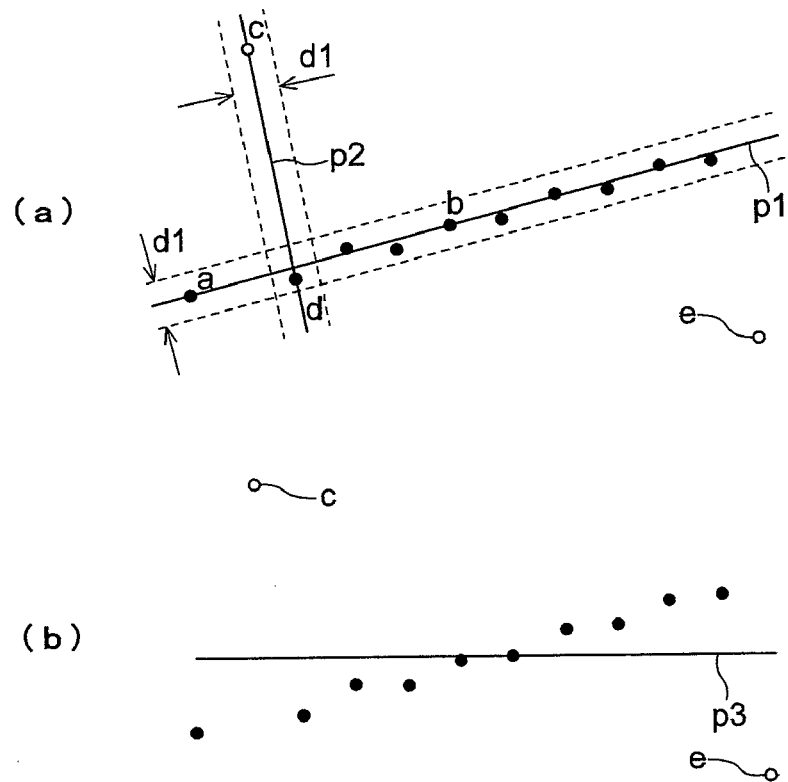
[FIG. 8] an explanatory view illustrating the principle of RANSAC.

FIG. 8 is an explanatory view illustrating the principle of RANSAC. According to RANSAC technique, a minimum number of dots required for fitting to straight or curved lines are randomly selected from a sample group and a fitting model is set. In case the target is a straight line, the minimum number is two, so straight lines connecting randomly selected two dots are set as fitting models p1, p2. In FIG. 8, black dots represent a group of samples called "inliers" belonging to a same group and white dots represent a group of noisy samples called "outliners" (the same applied to the plot in the graph of FIG. 7).

The fitting model p1 shows a case where two dots (a, b) both of which are inliers, were selected. The fitting model p2 shows a case where two dots (c, d) including an outliner were selected. In RANSAC, on the set fitting models p1, p2, evaluation is made to what extent the sample group fits within the predetermined tolerance d1. From FIG. 8, it may be understood that few samples fit to the fitting model p2 including an outliner. This evaluation is effected in repetition, with sequential random selection of two dots, and the most fit fitting model is determined as the straight line. Needless to say, it is possible to provide a "fitness" threshold value for the fitting model, so that the above determination is made when this threshold value is exceeded.

Incidentally, if a straight line is set with using e.g. the least square technique on the sample group shown in FIG. 8 ($a$), due to the outlier dots c and e, a straight line p3 largely deviated from the proper straight line will be set as shown in FIG. 8($b$). Since there is high possibility of noisy samples being mixed in the optical flow, it is advantageous to employ the RANSAC technique having high noise resistance.

Referring back to FIG. 7, the dots included in a predetermined range D relative to the parameter straight line (Px and Py) set by the RANSAC technique are determined as the group belonging to a single optical flow.

Subsequently, a grouping operation of another group is effected. That is, from the samples from which the samples classified under the determined one group, a parameter straight line P is set and samples fit to this parameter straight line with the predetermined tolerance D are selected. With this, grouping operation of an optical flow belonging to another moving object is done. With repetition of this process, grouping operations for a plurality of moving objects are effected.

[Moving Object Determining Step (#7 in FIG. 6)]

The moving object determination unit 6 of the recognition unit 2 determines moving objects based upon the grouped optical flows. For instance, the moving object determination unit 6 determines a size, a type of the moving object, based upon the arrangement of the point feature. Further, the moving object determination unit 6 is capable also of calculating a distance to the moving object.

[Position/Velocity Estimating Step (#8 in FIG. 6)]

The moving object determining unit 6 is capable of calculating the distance from the camera 13 to the moving object by the following Formula (29), based on an assumption that the lowermost point of the optical flow is the road surface located in the same plane as the vehicle 30. The distance Z referred to above is a direction cosine toward the imaging direction (optical axis) of the distance from the camera 13 to the point feature of the object. If the image data is normalized in the horizontal direction in the above-described normalizing step, the imaging direction is the horizontal direction parallel with the road surface. Formula (29) is a calculation formula for the distance Z in case the imaging direction is in parallel with the road surface.

In Formula (29), the image plane coordinate is (u, v), the world coordinate is (X, Y, Z), the coordinate of the image center $O_I$ is (cu, cv) (see FIG. 3 and FIG. 6); and U=u−cu, V=v−cv.

$$Z = \frac{\left(\frac{f}{\delta_v}r_{21} - Vr_{31}\right)\left(\frac{f}{\delta_u}(s_1 - r_{12}h) - U(s_3 - r_{33}h)\right) - \left(\frac{f}{\delta_u}r_{11} - Ur_{31}\right)\left(\frac{f}{\delta_v}(s_2 - r_{22}h) - V(s_3 - r_{32}h)\right)}{\left(\frac{f}{\delta_v}r_{21} - Vr_{31}\right)\left(-\frac{f}{\delta_u}r_{13} + Ur_{33}\right) - \left(\frac{f}{\delta_u}r_{11} - Ur_{31}\right)\left(-\frac{f}{\delta_v}r_{23} + Vr_{33}\right)} \quad (29)$$

where, f is the focal length of the camera 13 as shown in FIG. 4 and the Formula (3). δu, δv are respectively physical distances of the pixels of the u-axis and the v-axis of the imaging elements of the camera 13. h is the height of the center (optical axis) of the lens 13 from the road surface. R=[$r_{ij}$] is the rotational matrix shown by Formula (1). And, S=[$s_k$] is the translational vector shown by Formula (2).

The moving object determination unit 6 can calculate the relative velocity between the moving object and the vehicle 30, based upon the position of the moving object obtained as described above. Further, the moving object determination unit 6 can also calculate the velocity of the moving object, with taking into consideration the velocity of the vehicle 30 obtained from the rotation sensor 18. That is, the relative velocity or the velocity can be calculated, based upon the time differences of the image data acquired in time series and the position of the moving object whish was obtained by effecting the image processing operations in time series, with using the image data. Specifically, in one cycle of the flowchart shown in FIG. 6, the instantaneous velocity of the moving object at time is calculated. Further, the moving object determination unit 6 is capable also of calculating the average velocity of the moving object to a certain time, based upon the cumulative moving distance and the lapsed time until that time.

[Recognition Reliability Calculating Step (#9 in FIG. 6)]

The recognition reliability calculation unit 7 calculates recognition reliability Cout indicative of the reliability of recognition of the moving object, based upon the result of at least one of the respective image processing operations by the recognition unit 2 described above. In the flowchart of FIG. 6, the reliability calculation unit 7 calculates the recognition reliability Cout after completion of all of the above-described image processing operations. Needless to say, however, the unit can calculate the recognition reliability Cout between a plurality of image processing operations.

For example, if the recognition reliability Cout s calculated based upon the result of point feature extraction as the result of one of the respective image processing operations, the recognition reliability calculating step #9 may be effected between the point feature extracting step #4 and the optical flow calculating step #5.

The specific method of extracting the recognition reliability Cout will be described later.

[Reporting Determining Steps (#10 Through #13 in FIG. 6)]

The reporting determination unit 8 determines whether the recognition result of the moving object is to be reported or not, according to the recognition reliability Cout calculated by the recognition reliability calculation unit 7. For instance, the reporting determination unit 8 determines that the result should be reported in an alarm mode if the recognition reliability Cout is greater than a predetermined first threshold value TH1 (#10, #11). Specifically, the result will be reported to a driver or rider of the vehicle 30 in e.g. a form shown in FIG. 9 (a), via the monitor 10 and/or the speaker 11 shown in FIG. 1.

Figure 9:
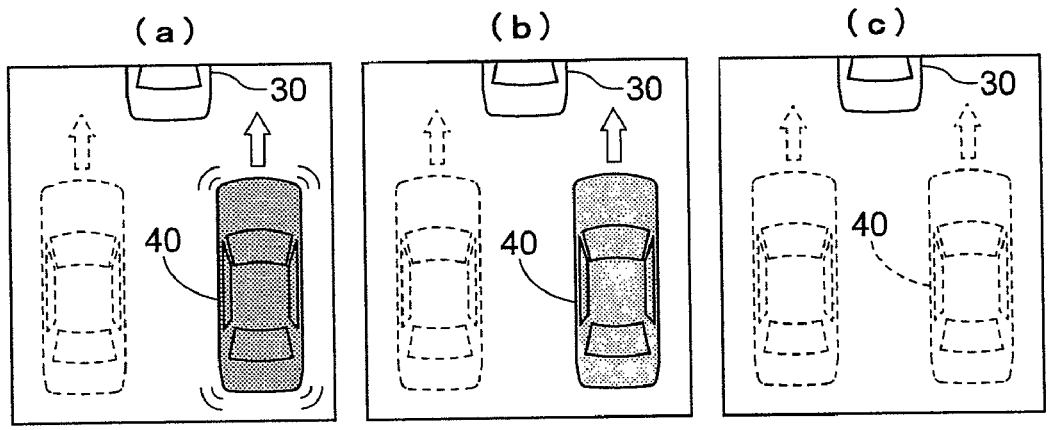
[FIG. 9] a view showing an example of reporting after moving object recognition.

FIG. 9 (a) shows a display screen on the monitor 10, with the self vehicle (vehicle 30) being shown at the upper center portion. And, rearwardly of the self vehicle (downwardly in the display screen), there is shown another vehicle (moving object 40) which is approaching the self vehicle from the left rear side or the right rear side thereof. In the example illustrated in FIG. 9 (a), the other vehicle is approaching from the right rear side and its recognition reliability Cout is greater than the first threshold value TH1, so the reporting is being made in the alarm mode. That is, an indicator indicating the other vehicle on the right side is blinking in red and a continuous or intermittent alarm sound is generated to alarm the driver and/or the rider.

In case the recognition reliability Cout is below the first threshold value TH1 but greater than a second threshold value TH2 set to a value lower than the first threshold value TH1, it is determined that reporting is needed in a caution mode with lower user recognizability than the alarm mode (#12, #13). In the example shown in FIG. 9 (b), another vehicle is approaching from the right rear side and reporting is being made in the caution mode, based upon its recognition reliability Cout. That is, an indicator indicating the other vehicle on the right side is illuminated continuously in yellow and an alarm sound is generated once to alarm the driver or rider.

If the recognition reliability Cout is below the second threshold value TH2, it is determined that no reporting at all is needed. In the case of the example shown in FIG. 9 (c), although another vehicle is approaching, no reporting thereof is being made, based upon its recognition reliability. That is, no indicators are illuminated and no alarm sound is generated.

The reporting determination unit 8 functions as the "reporting unit" of the invention in that the unit issues a reporting command to the monitor 10 and/or the speaker 11. Further, the reporting determination unit 8, the monitor 810 and the speaker 11 function as the reporting unit of the invention in that these cooperate to report to the driver and/or the rider.

[Recognition Reliability Cout]

Next, there are described some specific examples of the recognition reliability Cout which is calculated based upon the result of at least one of the respective image processing operations by the recognition unit.

(Feature Amount Reliability Cf)

As described hereinbefore, the point feature extraction unit 3 calculates the feature amount (e.g. KLT feature amount) indicative of the uniqueness of the point feature in the image data. Based upon this calculated feature amount, the reliability calculation unit 7 calculates the point feature reliability Cf indicative of the reliability of the extracted point feature. Then, the reliability calculation unit 7 calculates the recognition reliability Cout by using this point feature reliability Cf.

Figure 10:
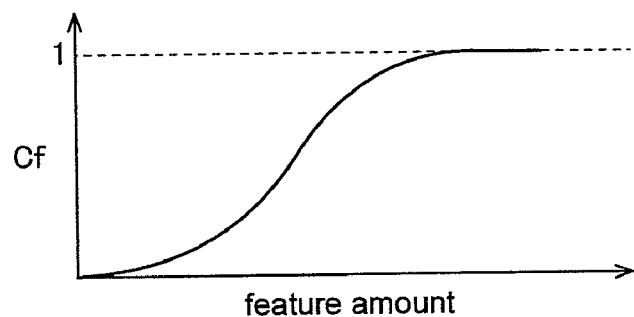
[FIG. 10] a graph illustrating relationship between point feature amounts and point feature reliability.

FIG. 10 is a graph illustrating an example of relationship between the feature amount and the point feature reliability Cf. As shown in this graph, the greater the feature amount, the higher the point feature reliability Cf along a non-linear map.

A greater feature amount means that there is a high contrast of the point feature in the image data and the point feature has been extracted distinctly. Therefore, the greater the feature amount, the higher the reliability of the recognition of the moving object. Here, the shape of this non-linear map is just an example. Needless to say, a map having any other desired characteristics can be employed instead.

In case the reliability calculation unit 7 calculates the recognition reliability Cout based solely on the image processing operation by the point feature extraction unit 3, Cout=Cf.

(Optical Flow Reliability Cv)

As described above, the optical flow calculation unit 4 calculates an optical flow, based upon a target area (template) around the point feature in previously acquired image data and an area in the image data acquired after lapse of a predetermined period which area has the highest correlativity value relative to the target area. Then, based upon this correlativity value, the reliability calculation unit 7 calculates an optical flow reliability Cv indicative of the reliability of the calculated optical flow. And, the reliability calculation unit 7 calculates the recognition reliability Cout, with using this optical flow reliability Cv.

Figure 11:
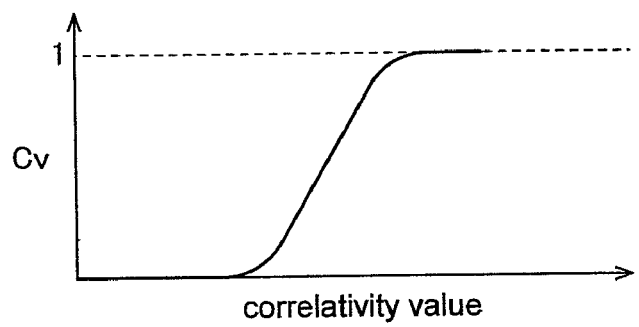
[FIG. 11] a graph illustrating relationship between correlativity values and optical flow reliability.

FIG. 11 is a graph illustrating relationship between correlativity values and optical flow reliability. As shown in this figure, the greater the correlativity value, the higher the optical flow reliability Cv along a non-linear map. A greater correlativity value means that there exists a high degree of matching between the two image data and the optical flow has been generated with high precision. Therefore, the greater the correlativity value, the higher the reliability of the recognition of the moving object. Like the point feature reliability Cf described above, the shape of this non-linear map is just an example. Needless to say, a map having any other desired characteristics can be employed instead.

In case the reliability calculation unit 7 calculates the recognition reliability Cout based solely on the image processing operation by the optical flow calculation unit 4, Cout=Cv.

(Grouping Reliability Cg)

As described above, the grouping unit 5 effects grouping of the calculated optical flows as optical flows belong to one moving object, based on the following two conditions.

The first condition or requirement is that extension lines L of the optical flows converge at the single point, i.e. the vanishing point within the predetermined constraint range. The second condition or requirement is that with one terminal end of the optical flow being an external dividing point, an external ratio between a line segment extending beyond the other terminal end to the vanishing point and this optical flow has a same value within the predetermined tolerance.

As a specific method of satisfying these conditions, as shown in FIG. 7, based on Formula (28), the relationship between the x component and the y component of each optical flow (dmi) and the point feature (m1i) is utilized.

The reliability calculation unit 7 calculates grouping reliability Cg, based on either one or both of the convergence of grouped optical flows relative to the parameter straight line P and the total number of the grouped optical flows. The grouping reliability Cg is a numeric value indicative of the reliability of the grouped optical flow belonging to the single moving object. Further, the reliability calculation unit 7 calculates the convergence, based on either one or both of the deviation of each grouped optical flow relative to each parameter straight line P (each grouping reference) and dispersion of this deviation. And, the reliability calculation unit 7 calculates the recognition reliability Cout, with using the grouping reliability Cg.

The details of the calculation method of the grouping reliability Cg will be described later, but, it is noted that in case the reliability calculation unit 7 calculates the recognition reliability Cout based solely on the image processing operation by the grouping unit 5, Cout=Cg.

The grouping reliability Cg comprises one or fusion of two or more of the following group consisting of a parameter deviation reliability Cg1, a parameter dispersion reliability Cg2 and a grouping point reliability Cg3. Each of these will be detailed next. But, before that, the calculation principle of the grouping reliability Cg will be explained.

Figure 12:
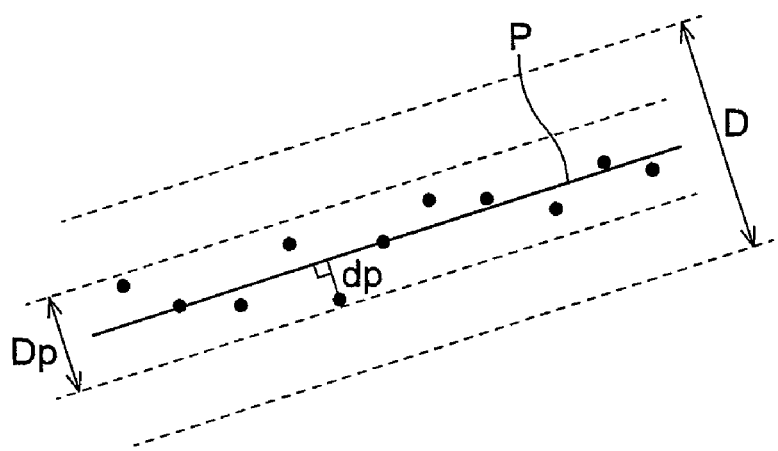
[FIG. 12] an explanatory view illustrating calculation principle of grouping reliability.

FIG. 12 is an explanatory view illustrating the calculation principle of the grouping reliability Cg. As described above, optical flows contained within the predetermined tolerance width D relative to the parameter straight line P are grouped as one group. In this, a deviation (deviation distance) dp from the parameter straight line P as a grouping reference to each optical flow is obtained. And, this deviation dp is divided by a dispersion value of the grouping data, thereby to obtain a parameter deviation.

Figure 13:
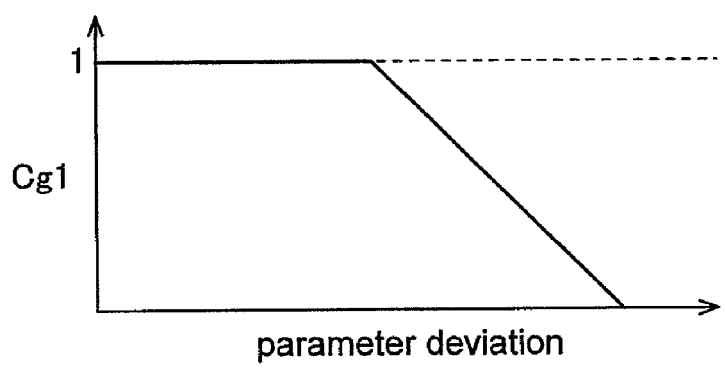
[FIG. 13] a graph illustrating the relationship between convergence of optical flow (deviation of each point feature) and the grouping reliability.

FIG. 13 is a graph illustrating the relationship between convergence of optical flow (deviation of each point feature) and the grouping reliability. More particularly, this is a graph illustrating an example of the relationship between the parameter deviation and the parameter deviation reliability Cg1. As shown in this graph, the graph shows the maximum reliability until the parameter deviation value reaches a predetermined value. Thereafter, as the value becomes greater beyond the predetermined value, the reliability becomes lower. This predetermined value can be variably set as desired. The smaller the parameter deviation value, the higher the convergence of the optical flow, hence, the higher the precision of the grouping of the optical flows. Therefore, the smaller the parameter deviation value, the higher the reliability of the recognition of the moving object. Incidentally, FIG. 13 employs a linear map after the predetermined value. Needless to say, a non-linear map can be employed, instead.

In case the reliability calculation unit 7 calculates the grouping reliability Cg based solely on the parameter deviation reliability Cg1, Cg=Cg1.

Figure 14:
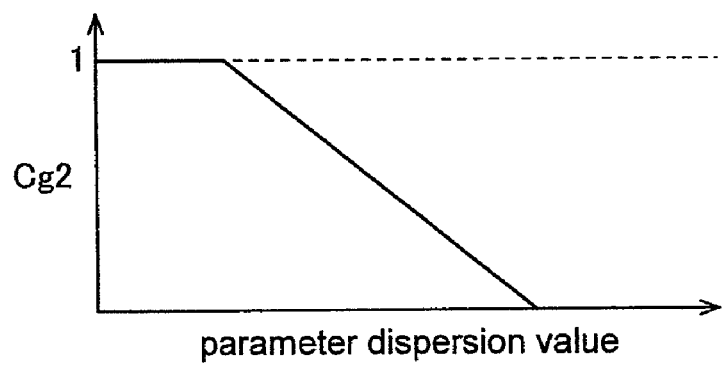
[FIG. 14] a graph illustrating the relationship between convergence of optical flow (dispersion value of each point feature) and the grouping reliability.

FIG. 14 is a graph illustrating the relationship between convergence of optical flow (dispersion value of each point feature) and the grouping reliability Cg. Specifically, this is a graph illustrating an example of the relationship between the dispersion value of parameter deviation and the parameter dispersion reliability Cg2. The parameter dispersion reliability Cg2 is calculated, based on deviation values of the parameter deviations of all of grouped point features. More particularly, this is calculated based on the width Dp shown in FIG. 12. The narrower the width Dp, the closer the optical flow to the parameter straight line P; hence, the higher the conversion of the optical flow, and the higher the precision of the optical flow grouping. In other words, the smaller the dispersion value of the parameter deviations, the higher the reliability of the recognition of the moving object.

As shown in FIG. 14, the graph shows the maximum reliability until the dispersion value of the parameter deviation value reaches a predetermined value. Thereafter, as the value becomes greater beyond the predetermined value, the reliability becomes lower. This predetermined value can be variably set as desired, as a matter of course. Incidentally, FIG. 14 employs a linear map after the predetermined value, but a non-linear map can be employed, instead.

In case the reliability calculation unit 7 calculates the grouping reliability Cg based solely on the parameter dispersion reliability Cg2, Cg=Cg2.

Figure 15:
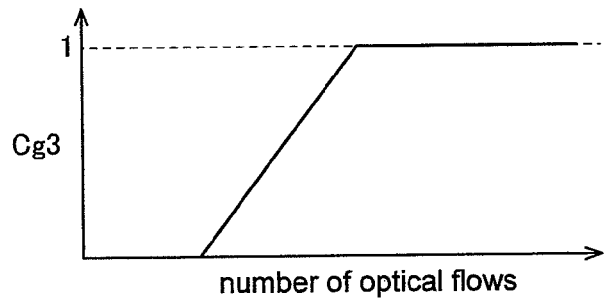
[FIG. 15] a graph illustrating the relationship between the total number of grouped optical flows and the grouping reliability.

FIG. 15 is a graph illustrating the relationship between the total number of grouped optical flows and the grouping reliability Cg. Specifically, this is a graph showing an example of the relationship between the total number of grouped optical flows and the grouping point reliability Cg3. Needless to say, the greater the total number of optical flows grouped as belonging to one moving object, the higher the reliability of recognition. Therefore, as shown in FIG. 15, as the total number of optical flows increases to a predetermined value, the grouping point reliability Cg3 too increases. When the total number of optical flows has reached a sufficient number (predetermined value), the grouping point reliability Cg3 becomes maximum. Needless to say, this predetermined value can vary as desired and the map of the grouping point reliability Cg3 is not limited to the linear one, but can be a non-linear one.

In case the reliability calculation unit 7 calculates the grouping reliability Cg based solely on the grouping point reliability Cg3, Cg=Cg3.

As described hereinbefore, the grouping reliability Cg can be fusion of two or all of the group consisting of the parameter deviation reliability Cg1, the parameter dispersion reliability Cg2 and the grouping point reliability Cg3. As a method of fusion, this can be a logical product of the respective reliabilities (Cg=Cg1·Cg2·Cg3). Needless to say, it is possible to vary the degree of influence by multiplying each reliability with a coefficient. This coefficient includes zero, as a matter of course.

(Fused Reliability Cy (Secondary Intermediate Reliability))

The reliabilities calculated based on the results of the principal image processing operations at the recognition unit 2, i.e. the results of the plurality of respective image processing operations including at least the point feature extraction, the optical flow calculation and the grouping, are provided as "primary intermediate reliabilities" indicative of the reliabilities of the results of the respective image processing operations. That is, the above-described point feature reliability Cf, optical flow reliability Cv, and the grouping reliability Cg are primary intermediate reliabilities.

And, a reliability which comprises either one selected from the primary intermediate reliabilities or a fusion of a plurality of the same is a "secondary intermediate reliability". As described above, in case e.g. the recognition reliability Cout is calculated based solely on the result of the image processing operation of point feature extraction, the point feature reliability Cf as a primary intermediate reliability, is selected as the secondary intermediate reliability Cy.

Further, in case the secondary intermediate reliability Cy is calculated by fusion of a plurality of intermediate reliabilities, the logical product (Cg=Cg1·Cg2·Cg3) is employed. In obtaining the grouping reliability Cg, for obtaining the logical product, it is possible to vary the degree of influence of each reliability by multiplying each reliability with a coefficient, as described above. And, this coefficient includes zero, as a matter of course.

The reliability calculation unit 7 may calculate the secondary intermediate reliability Cy and output this as Cout=Cy. Needless to say, since this secondary intermediate reliability Cy is either one of the primary intermediate reliabilities or a fusion of two or more of the same, the above-described embodiment is contained entirely in the secondary intermediate reliability Cy.

(Continuity Reliability Ct)

As described hereinbefore, the recognition unit 2 executes image processing operations sequentially on the image data acquired in time series. Further, the reliability calculation unit 7 calculates the recognition reliabilities Cout according to the image processing operations effected in time series. The reliability calculation unit 7 is capable of calculate the recognition reliability Cout according to the latest image processing operation, based upon the result of this latest image processing operation and the previous recognition reliability calculated with using the result of the previous image processing operation. As this takes the continuity of the recognition reliability into consideration, this will be referred to as "continuity reliability Ct". The continuity reliability Ct can be calculated by the following Formula (30).

$$Ct = Kt \cdot Cy + (1 - Kt)Ctl \tag{30}$$

where, Ct1 is the previously calculated continuity reliability and Kt is the coefficient. And, the coefficient Kt is 0.7 for example, in which particular case, the latest continuity reliability Ct is calculated with using 70% of the reliability based on the latest image processing operation result and 30% of the previous image processing operation result.

The reliability calculation unit 7 can output the continuity reliability Ct calculated in this way as Cout=Ct.

(Moving Object Determination Reliability Co)

The recognition reliability calculation unit 7 can calculate the recognition reliability Cout based on the calculation result of the moving object determination unit 6 also. The moving object determination reliability Co is fusion comprised of a logical product (Co=Coa·Cob1·Cob2·Coc) of an average reliability Coa, an object reliability Cob1, position precision reliability Cob2, continuation reliability Coc to be described later.

Needless to say, it is also possible to vary the degree of influence of each reliability by multiplying each reliability with a coefficient (including zero). Further, like the foregoing case of suing the other reliabilities mentioned above, it is not essentially needed to fuse all of the reliabilities, but any one of the reliabilities may be selected for use.

The recognition reliability calculation unit 7 calculates the recognition reliability Cout with using this moving object determination reliability Co. Needless to say, the reliability calculation unit 7 may output the moving object determination reliability Co as Cout=Co.

The average reliability Coa is obtained by averaging the secondary intermediate reliability Cy relative to the n-units of optical flows whose secondary intermediate reliabilities Cy are included within a predetermined higher range as shown by the following Formula (31).

$$Coa = \frac{\sum_{i=1}^{n} Cy}{n} \tag{31}$$

Figure 16:
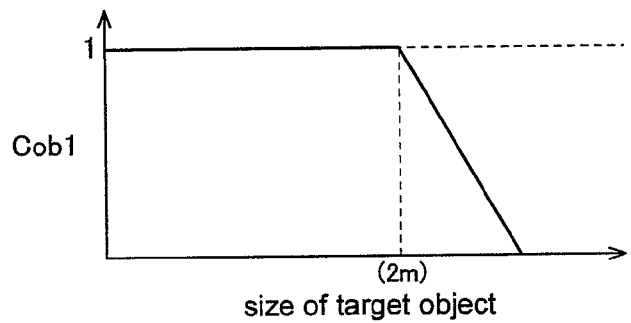
[FIG. 16] a graph illustrating an example of relationship between size of object and object reliability.

The object reliability Cob1 is calculated, based upon correlativity between a size permissible for a moving object as one recognition target and a physical size delimited by the range where the optical flows grouped as belonging to one moving object are present. For instance, if the moving object as the recognition target is a vehicle, its size in the horizontal direction is estimated to be within 2 meters approximately. Therefore, if the size of the moving object estimated by the moving object determination unit 6 exceeds 2 meters as shown in FIG. 16, the reliability calculation unit 7 lowers the reliability. That is, the object reliability Cob1 indicates the certainty whether the recognized moving object is truly the moving object to be recognized.

Incidentally, like the above-described various kinds of reliabilities, the threshold of 2 meters and the shape of the map, etc. can vary, as needed.

Figure 17:
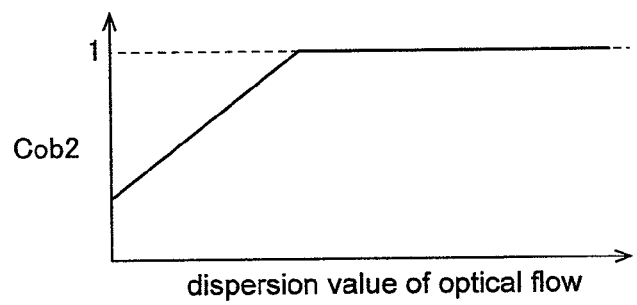
[FIG. 17] a graph illustrating an example of relationship between dispersion values of optical flows and position precision reliability.

The position precision reliability Cob2 is calculated, based upon the degree of dispersion of positions of the optical flows grouped as belonging to one recognized moving object, relative to the range corresponding to the size of the moving object as the recognition target. For example, if the self vehicle (vehicle 30) has been traveling with splashing water, it may happen that the image data of the captured rear view becomes blurred and indistinct with the splashed water. In such case, a portion of the moving object present rearward may become blurred and optical flow can be calculated on for a limited portion of the range corresponding to the size of the moving object as the recognition target. As shown in FIG. 17, the position precision reliability Cob2 is calculated, based on the dispersion value of the dispersion of the optical flows in the range corresponding to the size of the moving object as the recognition target. That is to say, the more "appropriately" the optical flows are dispersed in this range, the higher the reliability. In this way, the position precision reliability Cob2 indicates the certainty of the position of the presence of the moving object.

Incidentally, like the various reliabilities described above, the value of the flexion point and the shape, etc. of the map can vary as desired or needed.

The continuity reliability Coc is a reliability focused on the continuity of the position of the recognized moving object. As described above, the moving object determination unit 6 calculates the instantaneous velocity and the average velocity at each time of the moving object, based upon the time differences of the image data capture and acquired in time series and the positions of the moving object obtained by the execution of image processing operations in time series with using the image data. The reliability calculation unit 7 calculates the continuity reliability Coc indicative of the certainty of the recognized moving object remains the same through the image processing operations executed in times series, based on the deviation amounts of the respective instantaneous velocities relative to the average velocity. The velocity deviation amount Vd is calculated by the following Formula (32). Where, Z0 is a distance based on the result of the latest image processing operation result, and Z1 is a distance based on the result of the previous image processing operation result. The average velocity is obtained by multiplying a distance difference between each one cycle of image processing operation and the previous cycle of image processing operation for the past n-times and then averaging the resultant product by the total number of times (n) and then dividing this by the time difference $\Delta t$ of the time series.

$$Vd = \frac{(Z0 - Z1) - \frac{\sum_{i=1}^{n} \{Zi - Z(i-1)\}}{n}}{\Delta t} \quad (32)$$

Figure 18:
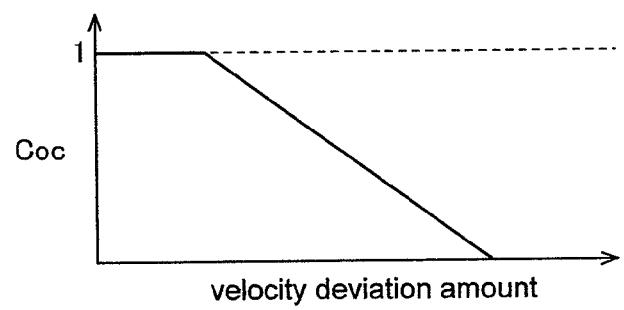
[FIG. 18] a graph illustrating an example of relationship between velocity deviation amounts and continuity reliability.

FIG. 18 is a graph illustrating an example of relationship between velocity deviation amounts Vd and continuity reliability. As shown in this figure, the greater the velocity deviation amount Vd, the lower the continuity reliability Coc. Incidentally, like the various reliabilities described above, the value of the flexion point and the shape, etc. of the map can vary as desired or needed.

Based upon the recognition reliability Cout obtained in the manners described above, the moving object recognizing apparatus is capable of detecting approaching of a moving object. In this example, as shown in the figure, the threshold value of the recognition reliability Cout is set from 0 to 1. Therefore, by setting the first threshold value to 0.9 and the second threshold value to 0.2, etc., effective reporting is made possible. Namely, with use of the recognition reliability Cout, highly reliable reporting is made possible as needed.

Needless to say, the range of value of the recognition reliability Cout, the first threshold value TH1 and the second threshold value TH2 are not limited to the above examples, but can vary as needed. Further, the reporting method is not limited to the method having the alarm mode and the caution mode, with using these two threshold values. Instead, there may be provided a reporting mode in greater number of steps.

As described above, with the present invention, it is possible to provide a moving object recognizing apparatus which is capable of effectively indicating the result of image processing relating to moving object recognition and providing an appropriate reporting when needed.

Industrial Applicability

The present invention is applicable to a moving object recognizing apparatus for recognizing a moving object from image data. For instance, the present invention may be applied to a moving object recognizing apparatus for recognizing another vehicle approaching a self vehicle or to a drive assisting apparatus for assisting driving by a driver based upon its recognition result.

The invention claimed is:

1. A moving object recognizing apparatus comprising:
a data acquisition unit for acquiring image data obtained in time series by an imaging device;
a recognition unit for recognizing a moving object by executing a plurality of image processing operations on two of the image data obtained at different times, said plurality of image processing operations including an operation of calculating correlativity of a same recognition target pattern, said recognition unit including a point feature extraction unit for extracting a point feature used as said recognition target pattern from the image data, an optical flow calculation unit for calculating optical flows, based upon said point feature present in said two image data obtained at different times, and a grouping unit for grouping, from among the optical flows, optical flows belonging to one moving object, under a predetermined condition; and
a reliability calculation unit for calculating recognition reliability indicative of reliability of recognition of the moving object, based upon at least one of the results of the respective image processing operations by the recognition unit, said reliability calculation unit calculating the recognition reliability with using at least one of the group consisting of:
a plurality of primary intermediate reliabilities which are calculated based on the respective results of a plurality of the image processing operations including the image processing operations executed by said point feature extraction unit, said optical flow calculation unit, and said grouping unit and which indicate reliabilities of the results of the respective image processing operations;
a secondary intermediate reliability which is one selected from said primary intermediate reliabilities or a fusion of two or more of the primary intermediate reliabilities;
an average reliability obtained by averaging the secondary intermediate reliabilities of those optical flows whose secondary intermediate reliabilities are included within a predetermined higher range;

an object reliability calculated based upon correlativity between a size permissible for the moving object as one recognition target and a physical size delimited by an area where the optical flows grouped as belonging to the moving object are present, said object reliability indicating a degree of certainty whether the recognized moving object is truly the moving object to be recognized or not; and a position precision reliability calculated based upon the degree of dispersion of the positions of the optical flows grouped as belonging to the one recognized moving object and indicating the degree of certainty of the position of this recognized moving object.

2. The moving object recognizing apparatus according to claim 1, wherein said optical flow calculation unit calculates said optical flow, based upon;

a target area around said point feature in previously acquired image data, and an area included in image data acquired with lapse of a predetermined period after said previously acquired image data and having the highest correlativity value relative to said target area; and said reliability calculation unit calculates, based on said correlativity value, optical flow reliability indicative of reliability of said calculated optical flow and then calculates said recognition reliability with using said optical flow reliability.

3. The moving object recognizing apparatus according to claim 2, wherein said grouping unit groups, as the optical flows belonging in one moving object, particular optical flows among said calculate optical flows, which satisfy the following conditions;

said each particular optical flow has an extension which is convergent to a single vanishing point within a predetermining convergence range; and said each particular optical flow has a same external ratio within a predetermined tolerance range, said external ratio being relative to one end of said particular optical flow as an external dividing point and being determined between said particular optical flow and a line segment extending beyond the other end of said particular optical flow to said vanishing point;

said reliability calculation unit calculates grouping reliability indicative of reliability of said grouped optical flows belonging to said one moving object, based upon either one or both of convergence of the grouped optical flows and the total number of the grouped optical flows; and said reliability calculation unit calculates said recognition reliability with using said grouping reliability.

4. The moving object recognizing apparatus according to claim 3, wherein said reliability calculation unit may calculate said convergence, based upon either one or both of deviation of each optical flow grouped according to each grouping criteria and dispersion of said deviation.

5. The moving object recognizing apparatus according to claim 2, wherein said point feature extraction unit calculates a point feature amount indicative of a characteristic property of said point feature in the image data;

said reliability calculation unit calculates a point feature reliability indicative of reliability of the point feature extracted based upon said point feature amount; and said recognition reliability is calculated with using the point feature reliability.

6. The moving object recognizing apparatus according to claim 2, wherein said recognition unit executes the image processing operations in time series, according to the image data acquired in time series;

said reliability calculation unit calculates the recognition reliability according to said image processing operations executed in time series; and the recognition reliability calculated at said reliability calculation unit based upon the latest image processing operation is calculated, based upon;

the result of the latest image processing operation, and previously calculated recognition reliability calculated with using the result of the previous image processing operation.

7. The moving object recognizing apparatus according to claim 2, wherein said recognition unit calculates the instantaneous velocity of the moving object at each time and the average velocity thereof, based upon time differences of the image data acquired in time series and the position of the moving object obtained by executing the image processing operations in time series with using the image data; and said reliability calculation unit calculates continuity reliability indicative of the certainty whether the recognized moving object remains the same through the image processing operations executed in time series, based upon deviation amounts of the instantaneous velocities relative to the average velocity; and the recognition reliability is calculated, with using the continuity reliability.

8. The moving object recognizing apparatus according to claim 1, wherein said grouping unit groups, as the optical flows belonging in one moving object, particular optical flows among said calculate optical flows, which satisfy the following conditions;

said each particular optical flow has an extension which is convergent to a single vanishing point within a predetermining convergence range; and said each particular optical flow has a same external ratio within a predetermined tolerance range, said external ratio being relative to one end of said particular optical flow as an external dividing point and being determined between said particular optical flow and a line segment extending beyond the other end of said particular optical flow to said vanishing point;

said reliability calculation unit calculates grouping reliability indicative of reliability of said grouped optical flows belonging to said one moving object, based upon either one or both of convergence of the grouped optical flows and the total number of the grouped optical flows; and said reliability calculation unit calculates said recognition reliability with using said grouping reliability.

9. The moving object recognizing apparatus according to claim 8, wherein said reliability calculation unit may calculate said convergence, based upon either one or both of deviation of each optical flow grouped according to each grouping criteria and dispersion of said deviation.

10. The moving object recognizing apparatus according to claim 9, wherein said point feature extraction unit calculates a point feature amount indicative of a characteristic property of said point feature in the image data;

said reliability calculation unit calculates a point feature reliability indicative of reliability of the point feature extracted based upon said point feature amount; and said recognition reliability is calculated with using the point feature reliability.

11. The moving object recognizing apparatus according to claim 9, wherein said recognition unit executes the image processing operations in time series, according to the image data acquired in time series;
- said reliability calculation unit calculates the recognition reliability according to said image processing operations executed in time series; and
- the recognition reliability calculated at said reliability calculation unit based upon the latest image processing operation is calculated, based upon;
- the result of the latest image processing operation, and
- previously calculated recognition reliability calculated with using the result of the previous image processing operation.

12. The moving object recognizing apparatus according to claim 8, wherein said point feature extraction unit calculates a point feature amount indicative of a characteristic property of said point feature in the image data;
- said reliability calculation unit calculates a point feature reliability indicative of reliability of the point feature extracted based upon said point feature amount; and
- said recognition reliability is calculated with using the point feature reliability.

13. The moving object recognizing apparatus according to claim 8, wherein said recognition unit executes the image processing operations in time series, according to the image data acquired in time series;
- said reliability calculation unit calculates the recognition reliability according to said image processing operations executed in time series; and
- the recognition reliability calculated at said reliability calculation unit based upon the latest image processing operation is calculated, based upon;
- the result of the latest image processing operation, and
- previously calculated recognition reliability calculated with using the result of the previous image processing operation.

14. The moving object recognizing apparatus according to claim 8, wherein said recognition unit calculates the instantaneous velocity of the moving object at each time and the average velocity thereof, based upon time differences of the image data acquired in time series and the position of the moving object obtained by executing the image processing operations in time series with using the image data; and
- said reliability calculation unit calculates continuity reliability indicative of the certainty whether the recognized moving object remains the same through the image processing operations executed in time series, based upon deviation amounts of the instantaneous velocities relative to the average velocity; and the recognition reliability is calculated, with using the continuity reliability.

15. The moving object recognizing apparatus according to claim 1, wherein said point feature extraction unit calculates a point feature amount indicative of a characteristic property of said point feature in the image data;
- said reliability calculation unit calculates a point feature reliability indicative of reliability of the point feature extracted based upon said point feature amount; and
- said recognition reliability is calculated with using the point feature reliability.

16. The moving object recognizing apparatus according to claim 15, wherein said recognition unit executes the image processing operations in time series, according to the image data acquired in time series;
- said reliability calculation unit calculates the recognition reliability according to said image processing operations executed in time series; and
- the recognition reliability calculated at said reliability calculation unit based upon the latest image processing operation is calculated, based upon;
- the result of the latest image processing operation, and
- previously calculated recognition reliability calculated with using the result of the previous image processing operation.

17. The moving object recognizing apparatus according to claim 1, wherein said recognition unit executes the image processing operations in time series, according to the image data acquired in time series;
- said reliability calculation unit calculates the recognition reliability according to said image processing operations executed in time series; and
- the recognition reliability calculated at said reliability calculation unit based upon the latest image processing operation is calculated, based upon;
- the result of the latest image processing operation, and
- previously calculated recognition reliability calculated with using the result of the previous image processing operation.

18. The moving object recognizing apparatus according to claim 1, wherein said recognition unit calculates the instantaneous velocity of the moving object at each time and the average velocity thereof, based upon time differences of the image data acquired in time series and the position of the moving object obtained by executing the image processing operations in time series with using the image data; and
- said reliability calculation unit calculates continuity reliability indicative of the certainty whether the recognized moving object remains the same through the image processing operations executed in time series, based upon deviation amounts of the instantaneous velocities relative to the average velocity; and the recognition reliability is calculated, with using the continuity reliability.

19. The moving object recognizing apparatus according to claim 1, further comprising a reporting unit for reporting the recognition result of the moving object, in accordance with the recognition reliability.

20. The moving object recognizing apparatus according to claim 19, wherein the reporting unit
- reports the recognition result, in an alarm mode enabling speedy recognition by the user through at least either one of the visual perception and the auditory perception, if the recognition reliability is greater than a predetermined first threshold value; or
- reports the recognition result, in a caution mode of lower recognizability than the alarm mode, if the recognition reliability is below the first threshold value and greater than a second threshold value set to be smaller than the first threshold value; or
- does not report the recognition result at all, if the recognition reliability is below the second threshold value.

* * * * *